US012337788B2

United States Patent
Kim et al.

(10) Patent No.: US 12,337,788 B2
(45) Date of Patent: Jun. 24, 2025

(54) AIRBAG DEVICE

(71) Applicants: Hyundai Motor Company, Seoul (KR); Kia Corporation, Seoul (KR)

(72) Inventors: Sung Hoon Kim, Incheon (KR); Jun Yong Min, Yongin-si (KR); Hyo Shub Shin, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 109 days.

(21) Appl. No.: 18/529,431

(22) Filed: Dec. 5, 2023

(65) Prior Publication Data

US 2025/0074351 A1    Mar. 6, 2025

(30) Foreign Application Priority Data

Sep. 6, 2023    (KR) .......... 10-2023-0118356

(51) Int. Cl.
| | |
|---|---|
| *B60R 21/232* | (2011.01) |
| *B60R 21/214* | (2011.01) |
| *B60R 21/231* | (2011.01) |
| *B60R 21/2338* | (2011.01) |

(52) U.S. Cl.
CPC .......... *B60R 21/232* (2013.01); *B60R 21/214* (2013.01); *B60R 21/23138* (2013.01); *B60R 2021/23386* (2013.01)

(58) Field of Classification Search
CPC .. B60R 1/232; B60R 21/214; B60R 21/23138
See application file for complete search history.

(56) References Cited

U.S. PATENT DOCUMENTS

| | | | |
|---|---|---|---|
| 6,877,769 B2 * | 4/2005 | Kim .................. | B60R 21/232 280/730.2 |
| 7,618,057 B2 * | 11/2009 | Pinsenschaum .... | B60R 21/2338 280/730.2 |
| 9,539,978 B2 * | 1/2017 | Mazanek .............. | B60R 21/232 |
| 9,744,932 B1 | 8/2017 | Faruque et al. | |
| 10,696,265 B2 * | 6/2020 | Shin .................... | B60R 21/2338 |
| 11,618,406 B2 * | 4/2023 | Nagasawa ............. | B60R 21/233 280/730.2 |
| 2017/0225641 A1 | 8/2017 | Faruque et al. | |
| 2017/0247006 A1 | 8/2017 | Rao et al. | |
| 2017/0259772 A1 | 9/2017 | Farooq et al. | |
| 2017/0259774 A1 | 9/2017 | Matsushita et al. | |

FOREIGN PATENT DOCUMENTS

| | | | |
|---|---|---|---|
| JP | 2015000623 A | * | 1/2015 |
| JP | 2015013558 A | * | 1/2015 |

* cited by examiner

*Primary Examiner* — Faye M Fleming
(74) *Attorney, Agent, or Firm* — Slater Matsil, LLP

(57) ABSTRACT

An embodiment airbag device includes a first airbag configured to be deployed in a shape covering a lateral outer periphery in a vehicle and a second airbag configured to be deployed at a position different from a position of the first airbag in the vehicle and coupled and supported by a coupling device at a portion where the second airbag overlaps the first airbag.

19 Claims, 19 Drawing Sheets

AIRBAG DEVICE

CROSS-REFERENCE TO RELATED APPLICATIONS

This application claims the benefit of Korean Patent Application No. 10-2023-0118356, filed on Sep. 6, 2023, which application is hereby incorporated herein by reference.

TECHNICAL FIELD

The present disclosure relates to an airbag device.

BACKGROUND

In addition to airbags installed in front of a driver seat and a passenger seat and side airbags configured to be unfolded at lateral sides of the seats to prepare for broadside collisions, curtain airbags, which are configured to be unfolded and elongated along windows, are also commonly used.

The curtain airbag has airbag cushions elongated along front and rear rows, and an inflator is installed to supply gas into the airbag cushions.

Therefore, in the event of a collision accident of a vehicle, a sensor detects the collision accident, and the inflator quickly supplies gas into the airbag cushion, such that the airbag cushion is instantaneously deployed and protects an occupant from impact of a vehicle.

However, there occurs a problem in that the curtain airbag cannot properly perform a passenger protection function in a vehicle from which a B-pillar is removed.

That is, in the case of the vehicle mounted with the B-pillar, the B-pillar supports the airbag cushion of the curtain airbag, thereby safely protecting the passenger.

However, in the case of the vehicle from which the B-pillar is removed, the operation of the B-pillar for supporting the airbag cushion cannot be implemented. For this reason, there is a problem in that in the event of a vehicle rollover accident, the passenger is ejected out of the vehicle through a lateral vehicle glass, which leads to a serious injury.

The foregoing explained as the background is intended merely to aid in the understanding of the background of embodiments of the present disclosure and is not intended to mean that embodiments of the present disclosure fall within the purview of the related art that is already known to those skilled in the art.

SUMMARY

The present disclosure relates to an airbag device. Particular embodiments relate to an airbag device in which a curtain airbag is coupled to another airbag deployed around the curtain airbag, thereby reinforcing a supporting force of the airbag.

Embodiments of the present disclosure can solve problems in the art and provide an airbag device in which a curtain airbag is coupled to another airbag deployed around the curtain airbag, thereby reinforcing a supporting force of the airbag and safely protecting a passenger.

An embodiment of the present disclosure provides an airbag device including a first airbag configured to be deployed in a shape covering a lateral outer periphery in a vehicle and a second airbag configured to be deployed at a position different from a position of the first airbag in the vehicle and coupled and supported by a coupling device at a portion where the second airbag overlaps the first airbag.

A first support chamber may be deployed from the first airbag in a shape expanding toward the second airbag, and the first support chamber and the second airbag may be coupled by a first coupling device.

The first airbag may be a curtain airbag, the second airbag may be a side airbag configured to be deployed from a lateral surface of a seat, and the first coupling device may include a first side coupling part fixed to an outboard side of the side airbag and a first curtain coupling part fixed to an inboard side of the first support chamber, fixed to a position matched with the first side coupling part, and coupled to the first side coupling part.

The first support chamber may be deployed from a lower end of the curtain airbag.

The side airbag may be mounted on a fixing part provided on a lateral surface of a seatback, and the first side coupling part may be fixed to the side airbag positioned adjacent to the fixing part.

The fixing part may be provided as a plurality of fixing parts provided in an upward/downward direction at the lateral surface of the seatback, and the first side coupling part may be provided in a length section between the fixing parts.

The first side coupling part may be formed in a direction perpendicular to the seatback.

The first support chamber, together with the curtain airbag, may be deployed toward the side airbag and the first support chamber may be coupled to the side airbag while pushing the side airbag after the side airbag is deployed.

Gas holes may be formed between the curtain airbag and the first support chamber, such that the gas with which the curtain airbag is filled may fill the first support chamber through the gas holes.

The first support chamber may be roll-folded in an outboard manner from the inboard side to the outboard side, and the first support chamber may be deployed while a roll shape is unwound from the outboard side to the inboard side when the curtain airbag is deployed.

Second support chambers may be deployed from the first airbag in a shape covering the second airbag, and the second support chamber and the second airbag may be coupled by a second coupling device.

The first airbag may be a curtain airbag, the second airbag may be a side airbag configured to be deployed from a lateral surface of a seat, an insertion groove portion may be defined between the second support chambers at left and right sides as the second support chambers are deployed in a shape protruding downward from left and right sides of a lower end of the curtain airbag, an upper end of the side airbag may be inserted into the insertion groove portion, and the second support chambers may cover the upper end of the side airbag from the left and right sides.

The second coupling device may include a second curtain coupling part fixed to an inner surface of the insertion groove portion and a second side coupling part fixed to the upper end of the side airbag in a position matched with the second curtain coupling part to be coupled to the second curtain coupling part.

A catching protrusion portion may protrude from an inner surface of the insertion groove portion, a catching groove portion may be formed at the upper end of the side airbag in a position matched with the catching protrusion portion, and the catching protrusion portion may be caught by an inner portion of the catching groove portion.

The second support chambers, together with the curtain airbag, may be deployed toward the side airbag and the second support chambers may be coupled to the side airbag while pushing the side airbag toward the insertion groove portion after the side airbag is deployed.

The second support chambers may be roll-folded outward from the inside in an outboard manner, and the second support chambers may be deployed while roll shapes are unwound inward from the outside when the curtain airbag is deployed.

The first airbag may be deployed in a shape supporting one side of the second airbag, and the first airbag and the second airbag may be coupled by a third coupling device.

The first airbag may be a curtain airbag, the second airbag may be a side airbag configured to be deployed from a lateral surface of a seat, an upper end of the side airbag may be inclined downward from an inboard side to an outboard side, a lower end of the curtain airbag may be formed in a shape matched with an inclination of the upper end of the side airbag, and the curtain airbag may support the lateral surface of the outboard side of the side airbag.

The third coupling device may include a third side coupling part provided on the inclined surface of the upper end of the side airbag and a third curtain coupling part fixed to the inclined surface of the lower end of the curtain airbag in a position matched with the third side coupling part to be coupled to the third side coupling part.

The lower end of the curtain airbag may be roll-folded in an outboard manner from the inboard side to the outboard side, and the lower end of the curtain airbag may be deployed while a roll shape is unwound from the outboard side to the inboard side when the curtain airbag is deployed.

The curtain airbag may be supported on a lateral door, and the curtain airbag and the lateral door may be coupled by a fourth coupling device.

The fourth coupling device may include a fourth curtain coupling part fixed to a lateral surface of an outboard side of the curtain airbag and a door coupling part fixed to a lateral surface of an inboard side of a door trim in a position matched with the fourth curtain coupling part to be coupled to the fourth curtain coupling part.

A third support chamber may be deployed from the second airbag in a shape expanding toward the first airbag, and the third support chamber and the first airbag may be coupled by a fifth coupling device.

The first airbag may be a curtain airbag, the second airbag may be a front airbag configured to be deployed from a front side of a seat, and the fifth coupling device may include a front coupling part fixed to an outboard side of the third support chamber and a fifth curtain coupling part fixed to an inboard side of the curtain airbag in a position matched with the front coupling part to be coupled to the front coupling part.

The third support chamber, together with the front airbag, may be deployed toward the curtain airbag, and the third support chamber may be coupled to the curtain airbag while pushing the curtain airbag after the curtain airbag is deployed.

The third support chamber may be folded in the front airbag in a tuck-in manner. When the front airbag is deployed, the third support chamber may be deployed toward the curtain airbag.

The front coupling part may be formed in the upward/downward length direction of the curtain airbag.

A fourth support chamber may be deployed from the second airbag in a shape expanding toward the first airbag, and the fourth support chamber and the first airbag may be coupled by a sixth coupling device.

The first airbag may be a curtain airbag, the second airbag may be a roof airbag configured to be deployed downward from a roof of the vehicle, and the sixth coupling device may include a roof coupling part fixed to an outboard side of the fourth support chamber and a sixth curtain coupling part fixed to an inboard side of the curtain airbag in a position matched with the roof coupling part to be coupled to the roof coupling part.

The fourth support chamber, together with the roof airbag, may be deployed toward the curtain airbag and the fourth support chamber may be coupled to the roof airbag while pushing the roof airbag after the curtain airbag is deployed.

Gas holes may be formed between the roof airbag and the fourth support chamber, such that the gas with which the roof airbag is filled may fill the fourth support chamber through the gas holes.

The fourth support chamber may be roll-folded in an outboard manner from the inboard side to the outboard side. When the roof airbag is deployed, the fourth support chamber may be deployed while the roll shape is unwound from the outboard side to the inboard side.

According to the above-mentioned technical solutions of embodiments of the present disclosure described above, the curtain airbag is coupled to the side airbag, such that the side airbag reinforces the supporting force of the curtain airbag in the vehicle from which the B-pillar is removed. Therefore, the occupant is prevented from being completely or partially ejected through the lateral window glass in the event of a rollover accident or broadside collision of the vehicle, thereby reducing a risk of injury to the passenger.

Further, the front airbag is coupled to the curtain airbag, and the curtain airbag is deployed in a shape blocking the lateral surface of the front airbag. Therefore, in the event of a frontal or broadside collision such as a small-overlap collision or a new oblique moving deformable barrier collision, the passenger's head is prevented from being ejected to the lateral surface of the front airbag, thereby reducing a risk of injury to the passenger.

Further, the roof airbag is coupled to the curtain airbag, such that the supporting force is ensured against the inadvertent forward/rearward movement of the roof airbag. Therefore, the supporting force of the roof airbag is reinforced, and the motion of the passenger impacting the roof airbag is minimized, thereby safely protecting the passenger.

DETAILED DESCRIPTION OF ILLUSTRATIVE EMBODIMENTS

Figure 1:
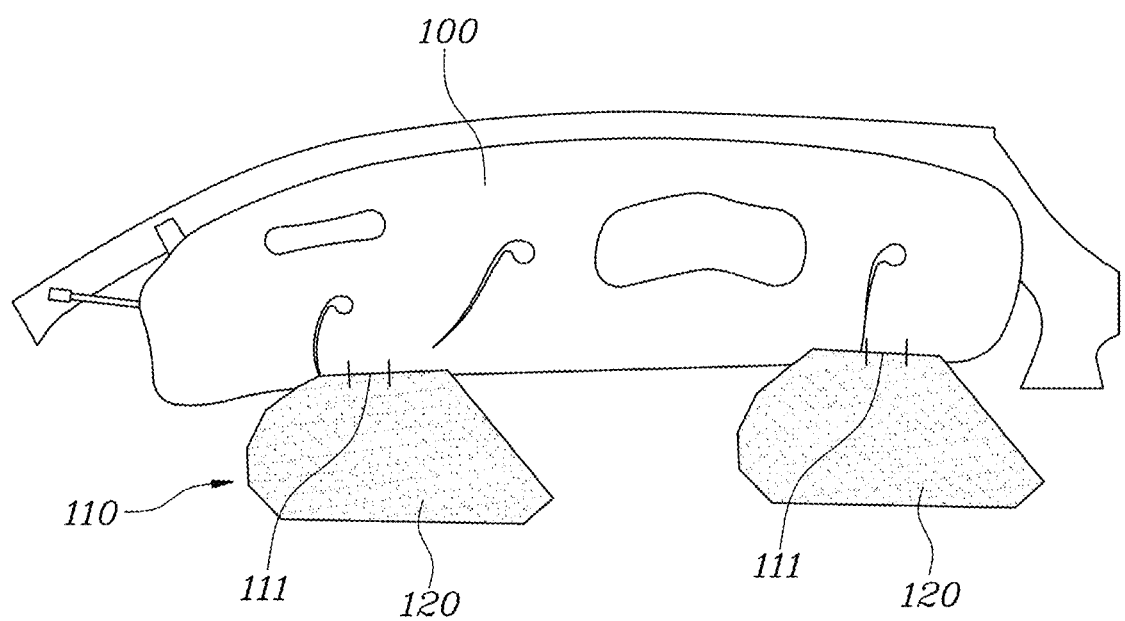
FIG. 1 is a view illustrating a shape in which a curtain airbag having a first support chamber is deployed according to an embodiment of the present disclosure.

Hereinafter, embodiments disclosed in the present specification will be described in detail with reference to the accompanying drawings. The same or similar constituent elements are assigned with the same reference numerals regardless of the figure number, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as having different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, exemplary embodiments of the present disclosure will be described in detail with reference to the accompanying drawings.

An airbag device of embodiments of the present disclosure includes a first airbag configured to be deployed in a shape covering a lateral outer periphery, e.g., a side window glass in a vehicle, and a second airbag configured to be deployed at a position different from a position of the first airbag in the vehicle and coupled and supported by a coupling device at a portion where the second airbag overlaps the first airbag.

For example, the first airbag may be a curtain airbag 100 configured to be deployed along front and rear rows inside a door of the vehicle.

Further, the second airbag may be any one of a side airbag 200 configured to be deployed from a lateral surface of a seat 10, a front airbag 300 configured to be deployed from a front side of a passenger seat, and a roof airbag 400 configured to be deployed downward from a roof of the vehicle.

In case that the first airbag and the second airbag are deployed in the event of an accident of the vehicle, there is a portion where a part of the first airbag and a part of the second airbag meet together while overlapping each other. In this portion, the first airbag and the second airbag are coupled by a coupling device.

As described above, the plurality of airbags configured to be deployed at different positions are coupled, which reinforces a supporting force of the airbag cushion, more stably restrains the passenger, and reduces a risk of injury to the passenger.

Meanwhile, the airbag device according to a first embodiment of the present disclosure provides a structure in which first support chambers 110 are deployed from the first airbag and are deployed in a shape expanding toward the second airbag, and the first support chambers 110 and the second airbag are coupled by a first coupling device.

The first airbag may be the curtain airbag 100, and the second airbag may be the side airbag 200 configured to be deployed from the lateral surface of the seat 10.

Further, the first coupling device includes a first side coupling part 210 fixed to an outboard side of the side airbag 200 and a first curtain coupling part 120 fixed to an inboard side of the first support chamber 110, fixed to a position matched with the first side coupling part 210, and coupled to the first side coupling part 210.

Figure 2:
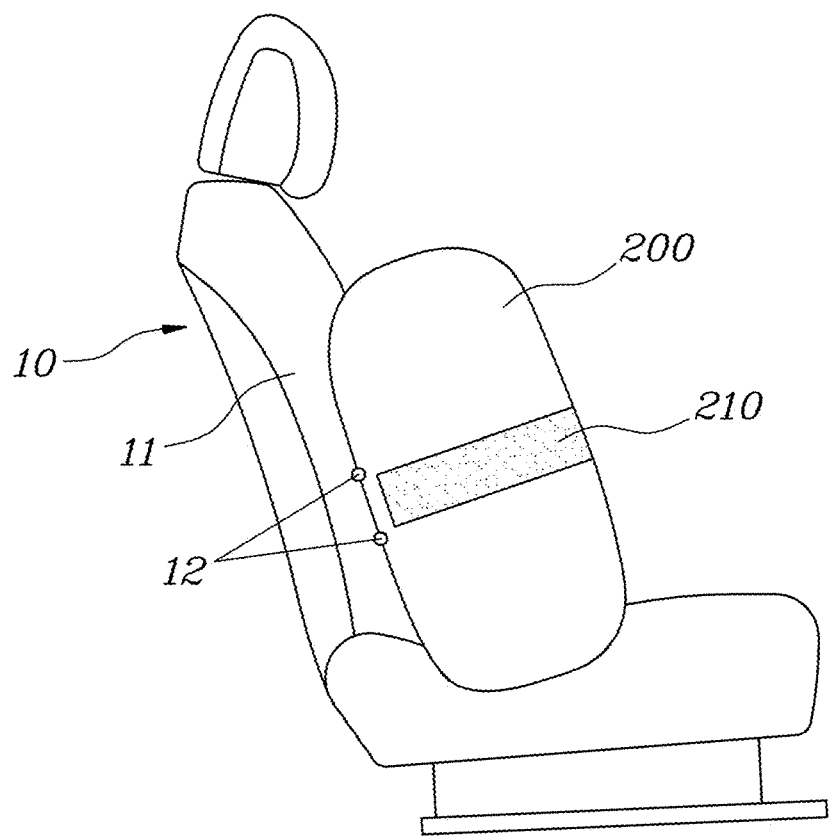
FIG. 2 is a view illustrating a shape in which a side airbag is deployed according to an embodiment of the present disclosure.
Figure 3:
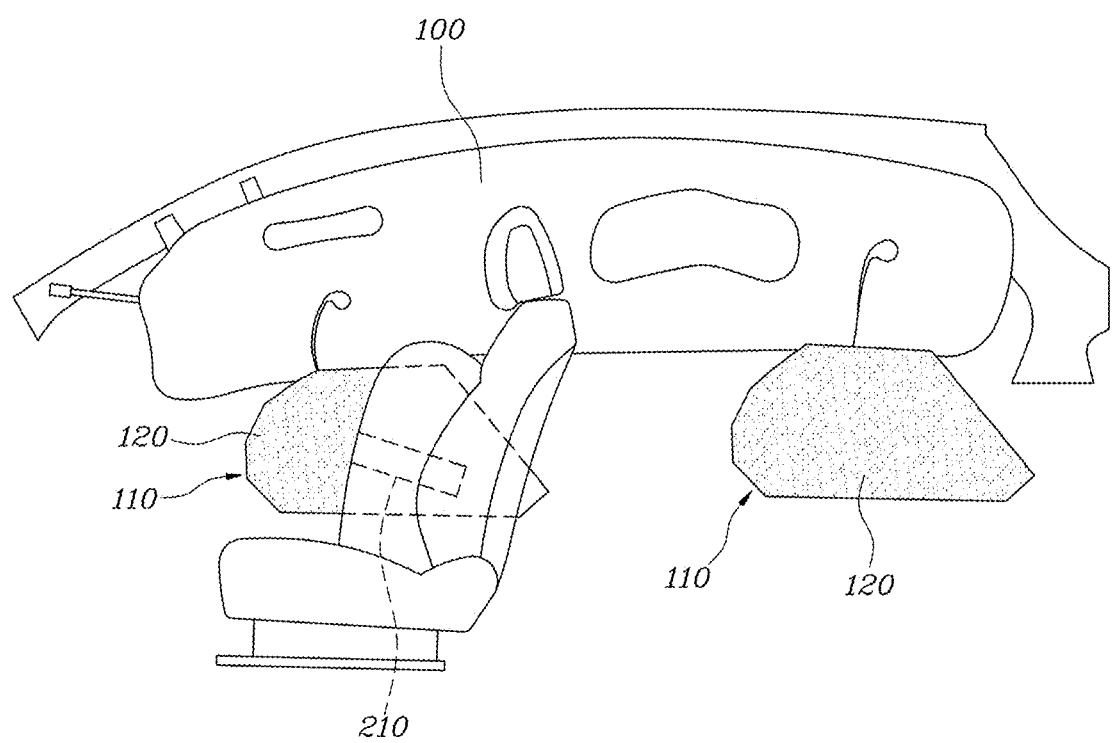
FIG. 3 is a view illustrating a shape in which the curtain airbag and the side airbag are coupled using a coupling device in a state in which the curtain airbag and the side airbag are deployed according to a first embodiment of the present disclosure.

With reference to FIGS. 1 to 3, a cushion of the curtain airbag 100 is provided in a shape wound in a roll shape along the front and rear rows from an upper end in the door of the vehicle.

Further, an inflator is connected to the cushion, and a gas discharged from the inflator is introduced into the cushion, such that the curtain airbag 100 is deployed.

In addition, the first support chamber 110 is deployed from the curtain airbag 100, and the first support chamber 110 is deployed downward toward the side airbag 200 from the outside of the side airbag 200.

Further, the first curtain coupling part 120 is fixed to a lateral surface of the first support chamber 110 directed toward the inboard side, and the first side coupling part 210 is fixed to a lateral surface of the side airbag 200 directed toward the outboard side, such that the first curtain coupling part 120 and the first side coupling part 210 are coupled.

The first curtain coupling part 120 and the first side coupling part 210 may be coupled in a hook and loop fastening manner. The first curtain coupling part 120 may be fixed to an entire inner surface of the first support chamber 110, and the first side coupling part 210 may be fixed to a part of an outer surface of the side airbag 200.

Therefore, the position of the first side coupling part 210 varies depending on the position and angle of the seat 10. The shape of the first support chamber 110 is set in consideration of all the forward and rearward/upward and downward movement amounts and reclining angles of the first-row and second-row seats 10 so that the first side coupling part 210 is stably coupled to the first curtain coupling part 120 even though the position of the first side coupling part 210 varies.

As described above, according to embodiments of the present disclosure, the curtain airbag 100 is coupled to the side airbag 200. In particular, when the passenger's head impacts the curtain airbag 100 in the B-pillar-less vehicle from which the B-pillar is removed, the side airbag 200 serves as the B-pillar and prevents the curtain airbag 100 from being pushed.

Therefore, because the supporting force of the curtain airbag 100 is reinforced by the side airbag 200, the occupant is prevented from being completely or partially ejected through a lateral window glass in the event of a rollover accident or broadside collision of the vehicle. Therefore, it is possible to reduce a risk of injury to the passenger and also satisfy the ejection mitigation (EJM) requirements in North America.

Further, according to an embodiment of the present disclosure, the first support chamber 110 may be deployed from a lower end of the curtain airbag 100.

For example, the first support chamber 110 may be deployed in a fan shape from the lower end of the curtain airbag 100.

That is, the first support chamber 110 extends from the lower end of the curtain airbag 100 close to the side airbag 200, such that the first support chamber 110 may stably overlap the side airbag 200.

Further, as illustrated in FIG. 2, according to an embodiment of the present disclosure, the side airbag 200 may be mounted on a fixing part 12 provided on a lateral surface of a seatback 11, and the first side coupling part 210 may be fixed to the side airbag 200 positioned adjacent to the fixing part 12.

Specifically, the fixing part 12 may be provided as a plurality of fixing parts 12 provided in an upward/downward direction at the lateral surface of the seatback 11, and the first side coupling part 210 may be provided in a length section between the fixing parts 12.

For example, the fixing part 12 may be an inflator stud 12 for mounting the inflator for the side airbag 200 on the seatback 11. The two inflator studs 12 are respectively provided at upper and lower sides of the lateral surface of the seatback 11.

Therefore, the side airbag 200 is coupled to the lateral surface of the seatback 11 by the inflator studs 12.

In particular, the first side coupling part 210 may be fixed in a section between the two inflator studs 12. In this case, the inflator stud 12 is provided at a point at which the side airbag 200 is mounted, i.e., a point at which an inadvertent movement of the side airbag 200 is minimized.

Therefore, the first side coupling part 210 is fixed at the mounting point at which an inadvertent movement of the side airbag 200 is minimized, such that the inadvertent movement of the side airbag 200 is minimized at the time of coupling the first curtain coupling part 120 to the first side coupling part 210. Therefore, the curtain airbag 100 may be more stably supported.

Furthermore, the first side coupling part 210 may be formed in a direction perpendicular to the seatback 11.

For example, the first side coupling part 210 is formed in a rectangular shape.

Further, the first side coupling part 210 is fixed to the side airbag 200 in the direction perpendicular to the seatback 11 and thus fixed to the first curtain coupling part 120 in a forward/rearward length direction of the vehicle.

Therefore, the coupling structure between the first side coupling part 210 and the first curtain coupling part 120 minimizes the inadvertent forward/rearward movements of the side airbag 200 and the first support chamber 110, thereby reinforcing the supporting force of the curtain airbag 100.

Next, according to an embodiment of the present disclosure, the first support chamber 110, together with the curtain airbag 100, is deployed toward the side airbag 200 after the side airbag 200 is deployed, such that the first support chamber 110 is coupled to the side airbag 200 while pushing the side airbag 200.

That is, after the side airbag 200 is deployed first, the curtain airbag 100 is deployed downward toward the side airbag 200, and the first support chamber 110 is deployed while pressing the side airbag 200, such that the first side coupling part 210 and the first curtain coupling part 120 are stably attached in a hook and loop fastening manner.

Further, as illustrated in FIG. 1, gas holes 111 are formed between the curtain airbag 100 and the first support chamber 110, such that the gas with which the curtain airbag 100 is filled may fill the first support chamber 110 through the gas holes 111.

That is, the gas holes 111 are formed at a lower end of the curtain airbag 100 and an upper end of the first support chamber 110 and communicate with each other. Therefore, when the curtain airbag 100 is deployed as the gas of the inflator is supplied to the curtain airbag 100, the gas in the curtain airbag 100 fills the first support chamber 110, such that the first support chamber 110 is deployed.

Therefore, the first support chamber 110 is deployed while pressing the side airbag 200, such that the first side coupling part 210 and the first curtain coupling part 120 are stably attached in a hook and loop fastening manner.

Figure 4:
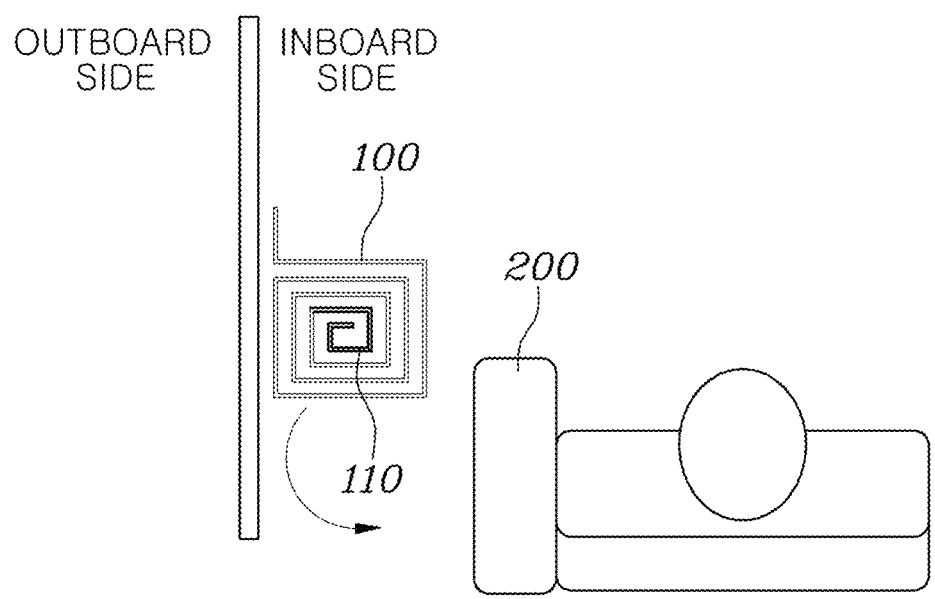
FIGS. 4 and 5 are views for explaining an operation in which the first support chamber is coupled to the side airbag while being unfolded according to an embodiment of the present disclosure.
Figure 5:
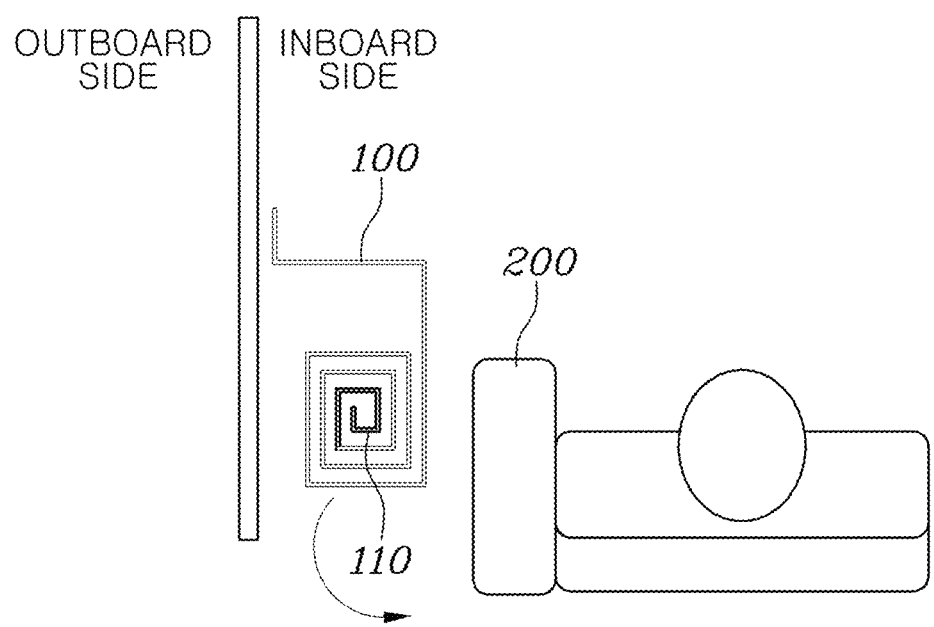

In addition, as illustrated in FIG. 4, the first support chamber 110 is roll-folded in an outboard manner from the inboard side to the outboard side, such that the first support chamber 110 may be deployed while the roll shape is unwound from the outboard side to the inboard side when the curtain airbag 100 is deployed.

That is, the curtain airbag 100 and the first support chamber 110, which are roll-folded at the upper end of the door, are unfolded and deployed while rotating downward toward the inboard side, and the first support chamber 110 presses and pushes an outer surface of the side airbag 200 toward the inboard side, such that the first side coupling part 210 and the first curtain coupling part 120 are more stably attached in a hook and loop fastening manner.

Meanwhile, an airbag device according to a second embodiment of the present disclosure provides a structure in which second support chambers 130 are deployed from the first airbag in a shape covering the second airbag, and the second support chambers 130 and the second airbag are coupled by a second coupling device.

The first airbag may be the curtain airbag 100, and the second airbag may be the side airbag 200 configured to be deployed from the lateral surface of the seat 10.

Further, the second support chambers 130 are deployed in a shape protruding downward from left and right sides of the lower end of the curtain airbag 100, such that an insertion groove portion 131 is formed between the second support chambers 130 disposed at the left and right sides. An upper end of the side airbag 200 is inserted into the insertion groove portion 131, such that the second support chambers 130 cover the upper end of the side airbag 200 from the left and right sides.

Further, the second coupling device includes a second curtain coupling part 140 fixed to an inner surface of the insertion groove portion 131 and a second side coupling part 220 fixed to the upper end of the side airbag 200, fixed to a position matched with the second curtain coupling part 140, and coupled to the second curtain coupling part 140.

Figure 6:
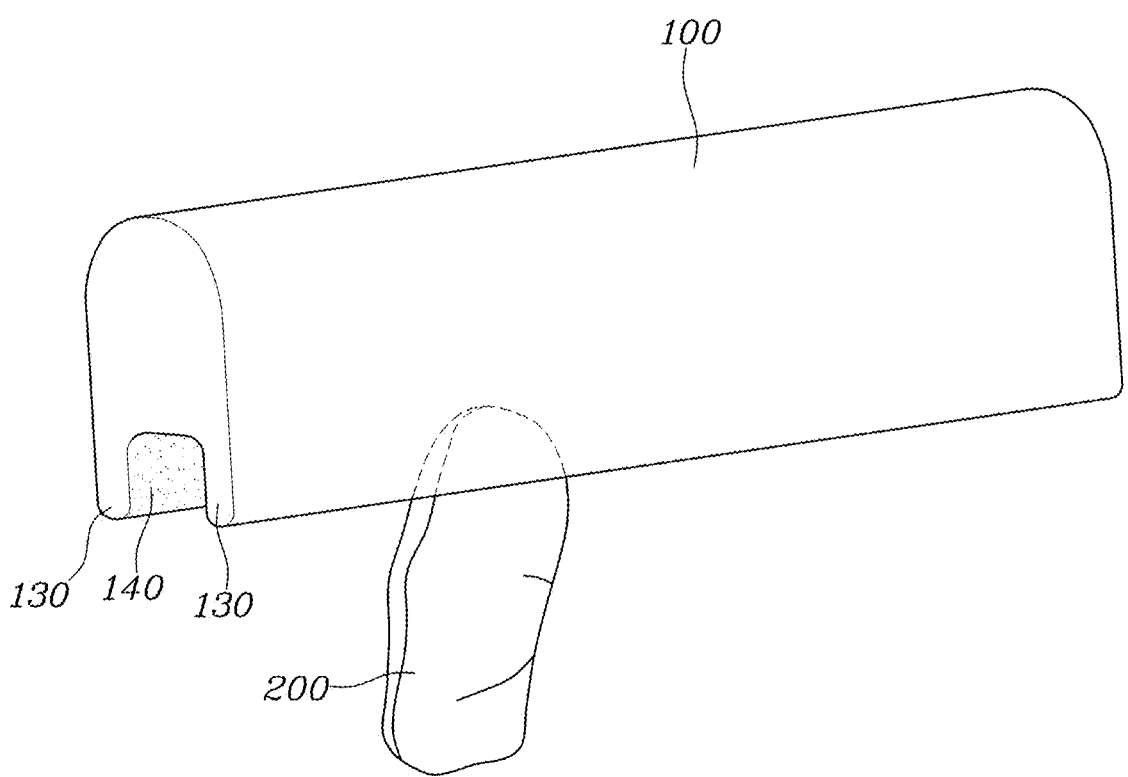
FIG. 6 is a view illustrating a shape in which the curtain airbag and the side airbag are coupled using the coupling device in a state in which the curtain airbag and the side airbag are deployed according to a second embodiment of the present disclosure.
Figure 7:
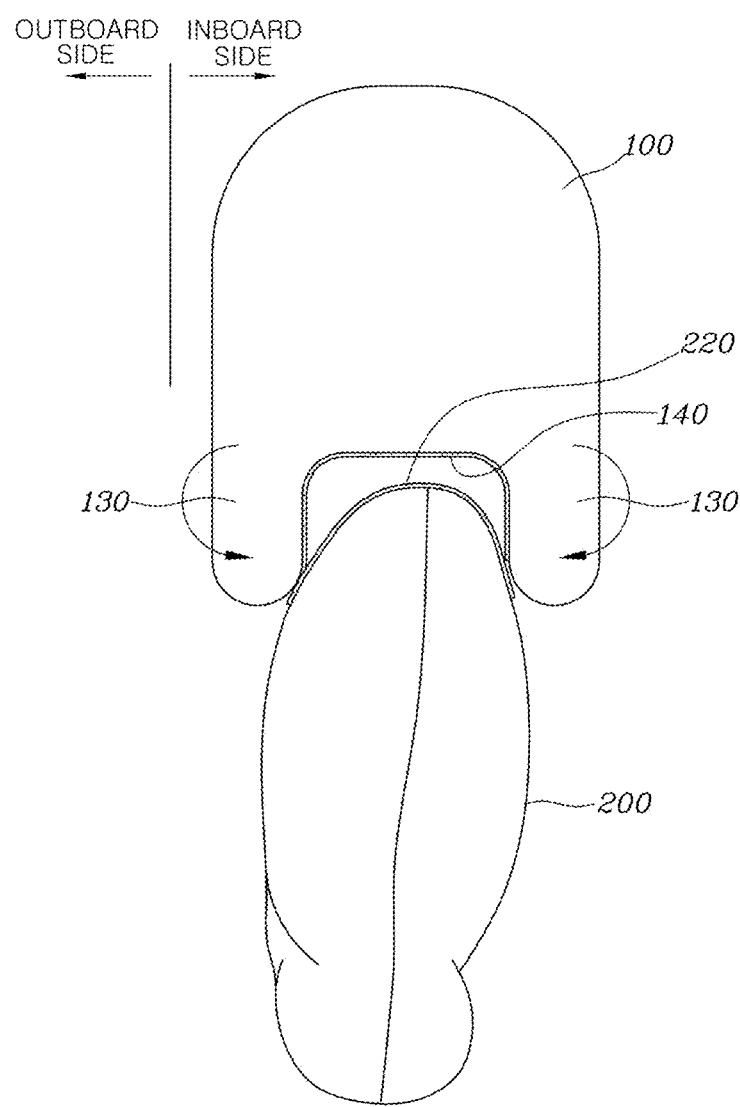
FIG. 7 is a view illustrating a shape in which a second support chamber is coupled to the side airbag according to an embodiment of the present disclosure.

With reference to FIGS. 6 and 7, the gas discharged from the inflator is introduced into the cushion of the side airbag 200, such that the side airbag 200 is deployed.

Further, the gas discharged from the inflator is introduced into the cushion of the curtain airbag 100, such that the curtain airbag 100 is deployed.

In particular, the second support chambers 130 are deployed in a shape protruding downward toward the side airbag 200 from the left and right sides of the lower end of the curtain airbag 100, such that a space of the insertion groove portion 131 is defined between the second support chamber 130 at the left side and the second support chamber 130 at the right side.

Further, the second support chambers 130 are deployed in a shape in which the insertion groove portion 131 covers the upper end of the side airbag 200 and the second support chamber 130 at the left side and the second support chamber 130 at the right side cover the left and right sides of the upper end of the side airbag 200.

In this case, the second curtain coupling part 140 is fixed to the inner surface of the insertion groove portion 131, the second side coupling part 220 is fixed to the left and right lateral surfaces of the upper end of the side airbag 200, and the second curtain coupling part 140 and the second side coupling part 220 are coupled.

The second curtain coupling part 140 and the second side coupling part 220 may be coupled in a hook and loop fastening manner. The second curtain coupling part 140 may be disposed on the entire inner surface of the insertion groove portion 131, and the second side coupling part 220 may be disposed on a part of the left and right outer surfaces of the upper end of the side airbag 200.

Figure 8:
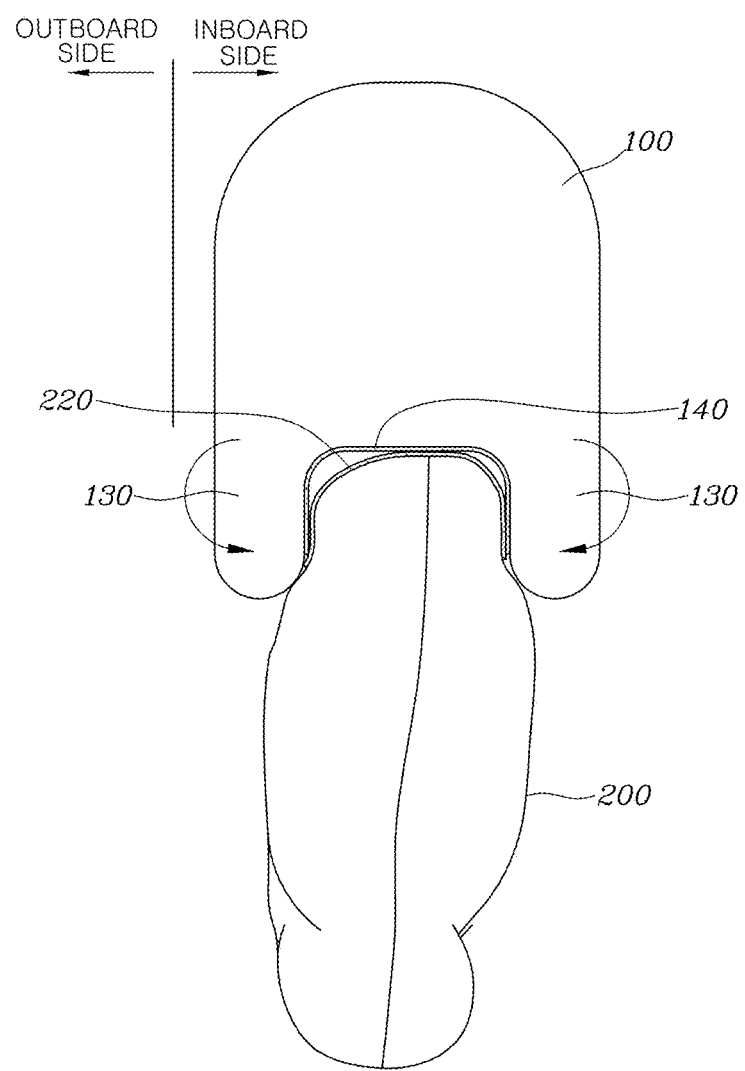
FIG. 8 is a view illustrating a shape in which the second support chamber is coupled to the side airbag in accordance with a change in position of a seat in FIG. 6.

In this case, as illustrated in FIGS. 7 and 8, the position of the second side coupling part 220 varies depending on the position and angle of the seat 10.

Therefore, the shape of the insertion groove portion 131 may be set in consideration of all the forward and rearward/upward and downward movement amounts and reclining angles of the first-row and second-row seats 10 so that the second side coupling part 220 is stably coupled to the second curtain coupling part 140 even though the position of the second side coupling part 220 varies.

Meanwhile, in an airbag device according to a third embodiment of the present disclosure, catching protrusion portions 132 may protrude from the inner surface of the insertion groove portion 131, and catching groove portions 201 may be formed at the upper end of the side airbag 200 and provided at positions matched with the catching protrusion portions 132, such that the catching protrusion portions 132 may be caught by inner portions of the catching groove portions 201.

Figure 10:
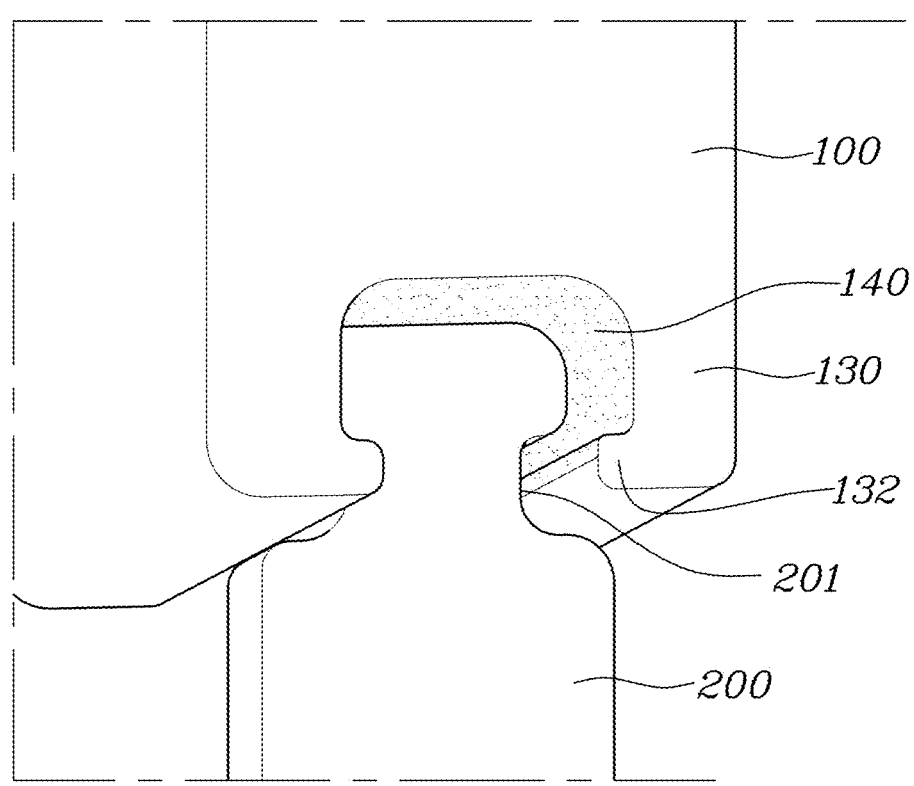
FIG. 10 is a view illustrating a shape in which the curtain airbag and the side airbag are coupled using the coupling device in a state in which the curtain airbag and the side airbag are deployed according to a third embodiment of the present disclosure.
Figure 11:
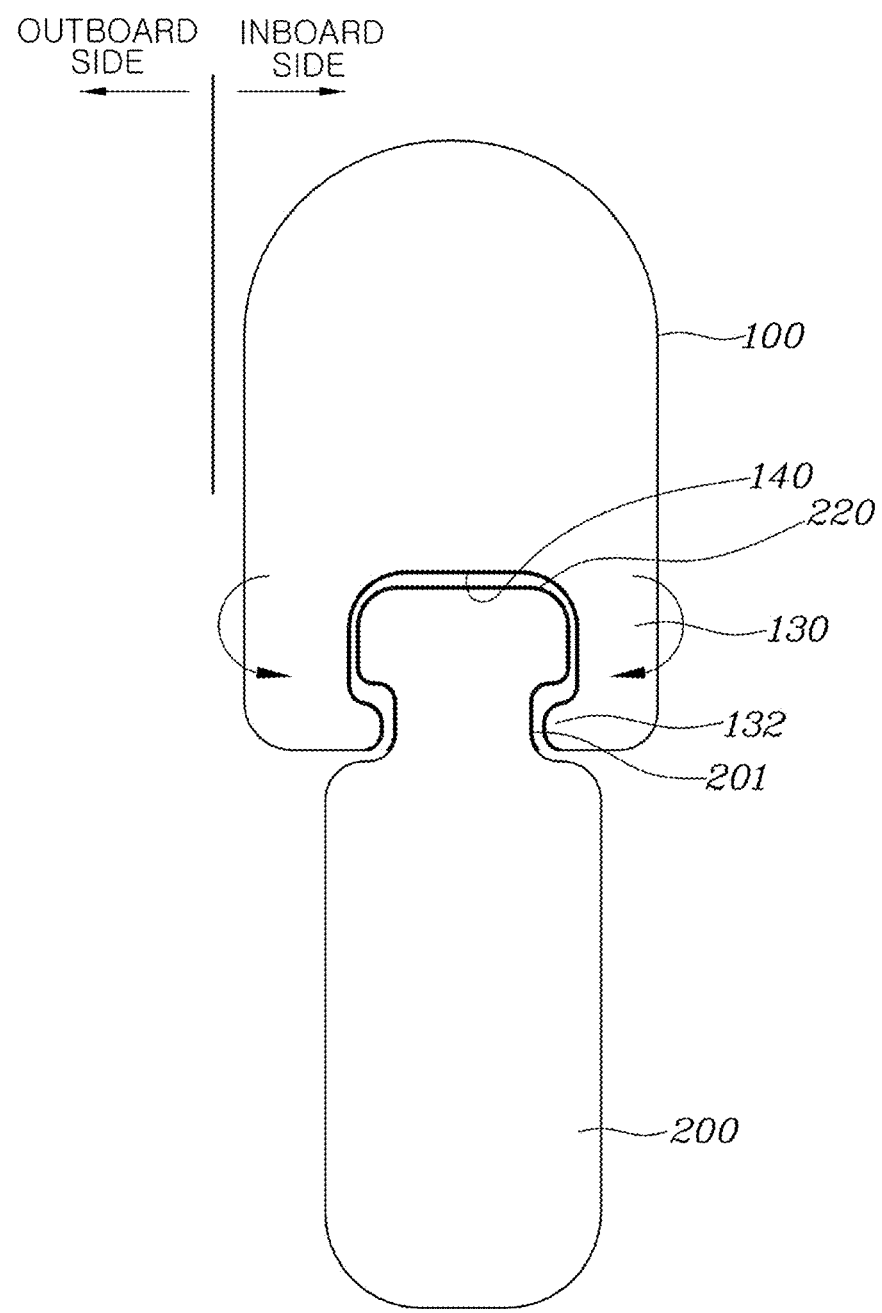
FIG. 11 is a view illustrating a structure in which a catching protrusion portion of a second support chamber is caught by a catching groove portion of the side airbag according to an embodiment of the present disclosure.

With reference to FIGS. 10 and 11, the catching protrusion portions 132 are formed toward the insertion groove portion 131 and provided at lower ends of the left and right inner surfaces of the insertion groove portion 131. Further, the catching groove portions 201 are formed in the left and right outer surfaces of the upper end of the side airbag 200 and have shapes corresponding to the catching protrusion portions 132.

In this case, the second curtain coupling part 140 is also provided on outer surfaces of the catching protrusion portions 132 connected to the inner surface of the insertion groove portion 131, and the second side coupling part 220 is also provided on inner surfaces of the catching groove portion 201, such that the curtain airbag 100 and the side airbag 200 may be more securely fixed by the second curtain coupling part 140 and the second side coupling part 220.

Next, as illustrated in FIGS. 7 and 11, according to an embodiment of the present disclosure, the second support chambers 130, together with the curtain airbag 100, are deployed toward the side airbag 200 after the side airbag 200 is deployed, such that the second support chambers 130 may be coupled to the side airbag 200 while pushing the side airbag 200 toward the insertion groove portion 131.

That is, after the side airbag 200 is deployed first, the curtain airbag 100 is deployed downward toward the side airbag 200, and the second support chambers 130 are deployed while pressing the upper end of the side airbag 200 from the left and right sides, such that the second side coupling part 220 and the second curtain coupling part 140 are more stably attached in a hook and loop fastening manner.

Further, according to embodiments of the present disclosure, the second support chambers 130 are roll-folded outward from the inside in an outboard manner. When the curtain airbag 100 is deployed, the second support chambers 130 may be deployed while the roll shape is unwound inward from the outside.

Figure 9:
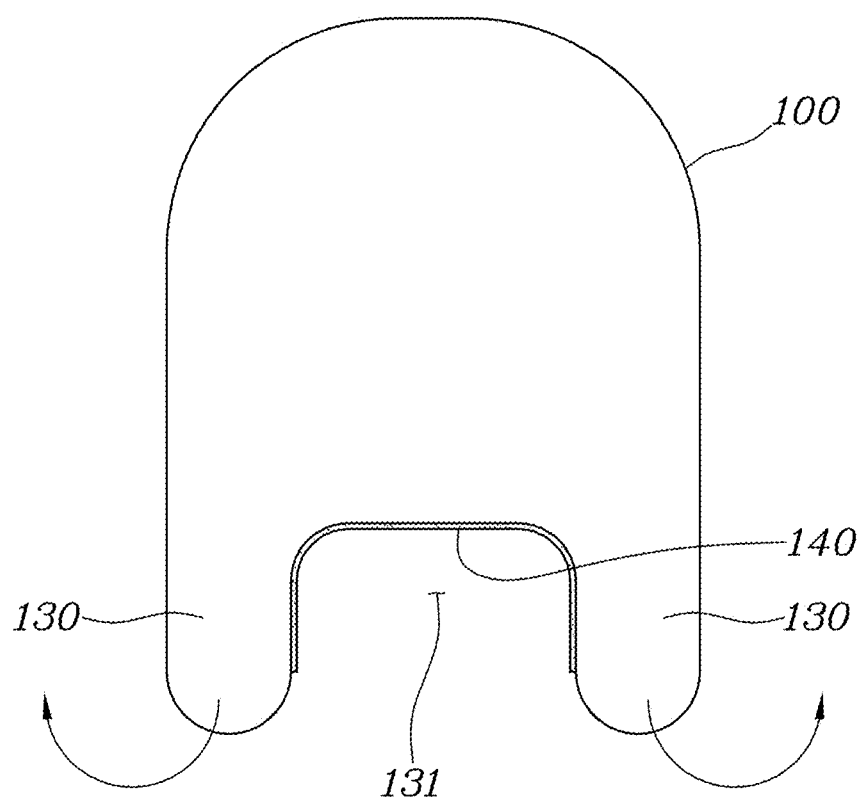
FIG. 9 is a view for explaining a direction in which the second support chamber is roll-folded according to an embodiment of the present disclosure.

That is, as illustrated in FIG. 9, the second support chambers 130 are structured to be roll-folded outward from the inside based on the insertion groove portion 131.

Therefore, the curtain airbag 100, which is roll-folded at the upper side of the door, is unfolded and deployed while rotating downward toward the inboard side. In particular, as illustrated in FIGS. 6 and 11, the second support chambers 130 are unfolded and deployed inward from the outside based on the insertion groove portion 131, such that the second support chambers 130 press and push the left and right outer surfaces of the upper end of the side airbag 200 toward the center of the side airbag 200. Therefore, the second side coupling part 220 and the second curtain coupling part 140 are more securely and stably attached in a hook and loop fastening manner.

Meanwhile, an airbag device according to a fourth embodiment of the present disclosure provides a structure in which the first airbag is deployed in a shape supporting one side of the second airbag, and the first airbag and the second airbag are coupled by a third coupling device.

The first airbag may be the curtain airbag 100, and the second airbag may be the side airbag 200 configured to be deployed from the lateral surface of the seat 10.

Further, the upper end of the side airbag 200 is inclined downward from the inboard side to the outboard side, and the lower end of the curtain airbag 100 is formed in a shape matched with the inclination of the upper end of the side airbag 200, such that the curtain airbag 100 supports a lateral surface of the outboard side of the side airbag 200.

Further, the third coupling device includes a third side coupling part 230 provided on an inclined surface of the upper end of the side airbag 200 and a third curtain coupling part 150 fixed to the inclined surface of the lower end of the curtain airbag 100, fixed to a position matched with the third side coupling part 230, and coupled to the third side coupling part 230.

Figure 12:
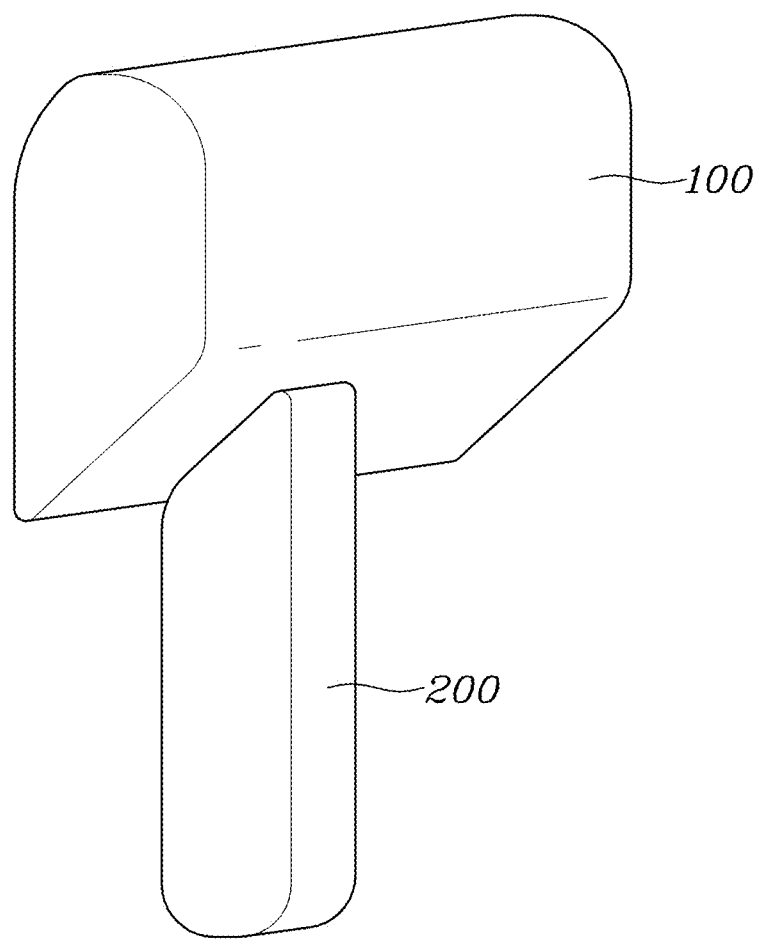
FIG. 12 is a view illustrating a shape in which the curtain airbag and the side airbag are coupled using the coupling device in a state in which the curtain airbag and the side airbag are deployed according to a fourth embodiment of the present disclosure.
Figure 13:
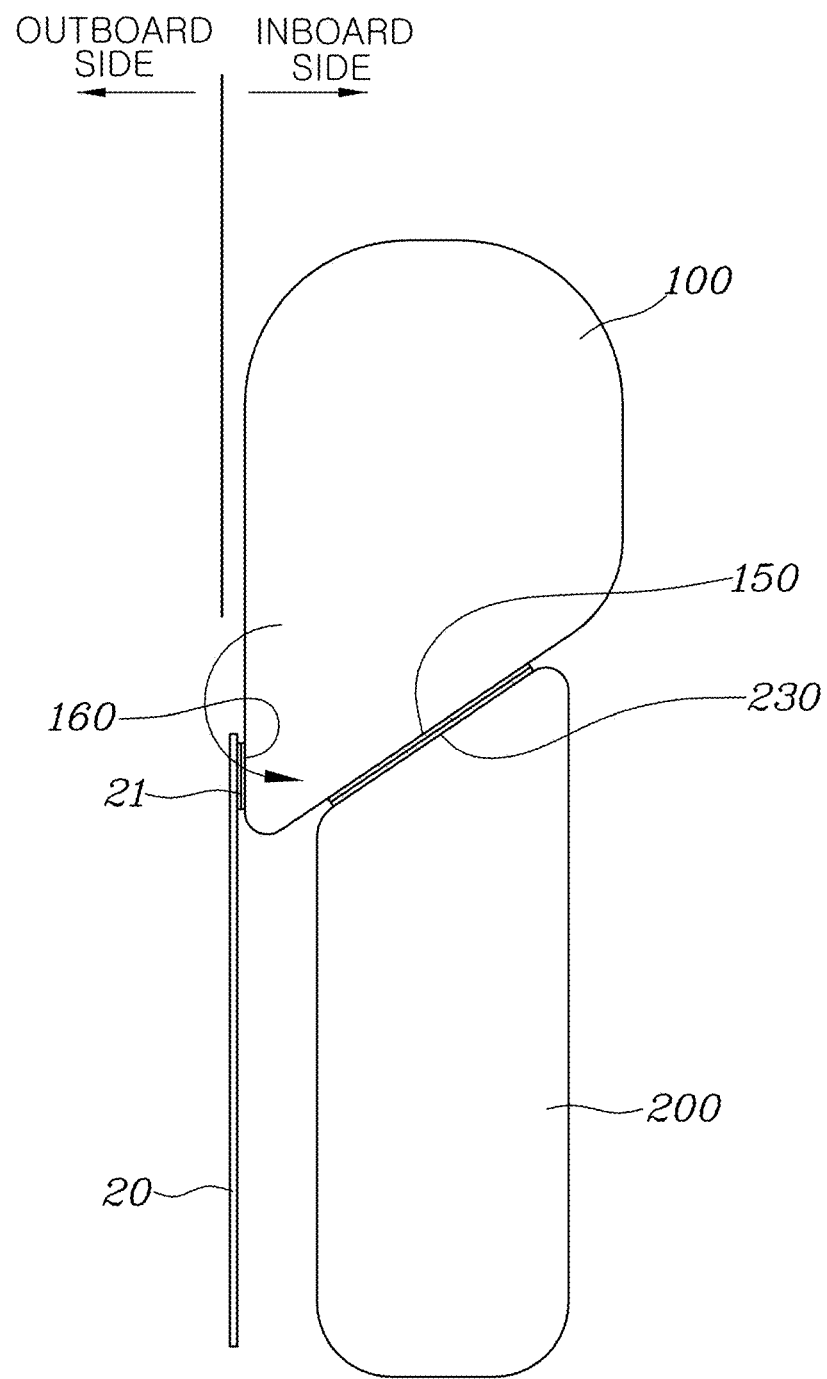
FIG. 13 is a view for explaining a structure in which a lower end inclined surface of the curtain airbag and an upper end inclined surface of the side airbag are coupled and a structure in which the curtain airbag and a door trim are coupled according to an embodiment of the present disclosure.

With reference to FIGS. 12 and 13, the gas discharged from the inflator is introduced into the cushion of the side airbag 200, such that the side airbag 200 is deployed.

Further, the gas discharged from the inflator is introduced into the cushion of the curtain airbag 100, such that the curtain airbag 100 is deployed.

In particular, an upper surface of the side airbag 200 is inclined downward from the inboard side to the outboard side, and a bottom surface of the curtain airbag 100, which faces the upper surface of the side airbag 200, is also inclined downward from the inboard side to the outboard side and formed as an inclined surface corresponding to the inclined surface of the upper surface of the side airbag 200.

Therefore, the curtain airbag 100 is deployed and supported in a shape in which the inclined surface of the lower end of the curtain airbag 100 covers the inclined surface of the upper end of the side airbag 200.

In this case, the third curtain coupling part 150 is fixed to the inclined surface of the lower end of the curtain airbag 100, and the third side coupling part 230 is fixed to the inclined surface of the upper end of the side airbag 200, such that the third curtain coupling part 150 and the third side coupling part 230 are coupled.

The third curtain coupling part 150 and the third side coupling part 230 may be coupled in a hook and loop fastening manner. The third curtain coupling part 150 may be disposed on the entire inclined surface of the lower end of the curtain airbag 100, and the third side coupling part 230 may be disposed on the entire inclined surface of the upper end of the side airbag 200.

Further, as illustrated in FIG. 13, the lower end of the curtain airbag 100 is roll-folded in an outboard manner from the inboard side to the outboard side, such that the lower end of the curtain airbag 100 may be deployed while the roll shape is unwound from the outboard side to the inboard side when the curtain airbag 100 is deployed.

That is, the curtain airbag 100 is structured such that the lower end of the curtain airbag 100 is roll-folded from the inboard side to the outboard side.

Therefore, the curtain airbag 100, which is roll-folded at the upper side of the door, is unfolded and deployed while rotating downward from the outboard side to the inboard side.

In particular, the lower end of the curtain airbag 100 is also unfolded and deployed from the outboard side to the inboard side, and the inclined surface of the lower end of the curtain airbag 100 presses and pushes the inclined surface of the upper end of the side airbag 200 toward the inboard side, such that the third side coupling part 230 and the third curtain coupling part 150 are more securely and stably attached in a hook and loop fastening manner.

Meanwhile, according to embodiments of the present disclosure, the curtain airbag 100 may be supported on a lateral door, and the curtain airbag 100 and the lateral door may be coupled by a fourth coupling device.

The fourth coupling device includes a fourth curtain coupling part 160 fixed to a lateral surface of the outboard side of the curtain airbag 100 and a door coupling part 21 fixed to a lateral surface of an inboard side of a door trim 20, fixed to a position matched with the fourth curtain coupling part 160, and coupled to the fourth curtain coupling part 160.

Figure 14:
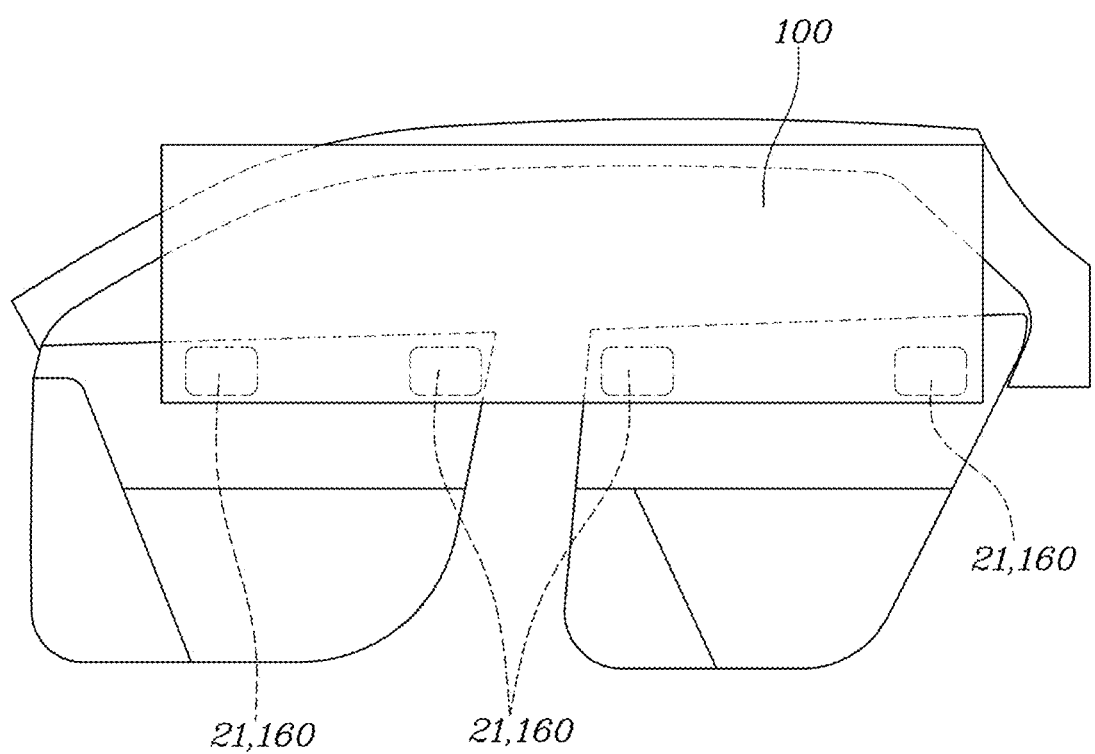
FIG. 14 is a view illustrating a position at which the curtain airbag and the door trim are coupled using a coupling device according to an embodiment of the present disclosure.

With reference to FIGS. 13 and 14, the gas discharged from the inflator is introduced into the cushion of the curtain airbag 100, such that the curtain airbag 100 is deployed.

The curtain airbag 100 is deployed downward at a position adjacent to the lateral surface of the inboard side of the door trim 20.

In particular, the plurality of fourth curtain coupling parts 160 is fixed to the outboard side of the lower end of the curtain airbag 100 and disposed at predetermined intervals in the forward/rearward length direction.

Further, the door coupling part 21 is fixed to a point on the door trim 20 corresponding to the fourth curtain coupling part 160. In this case, the fourth curtain coupling part 160 and the door coupling part 21 may be coupled in a hook and loop fastening manner.

As described above, the curtain airbag 100 is coupled to the door trim 20 by the fourth curtain coupling part 160 and the door coupling part 21. In particular, when the passenger's load is applied to the side airbag 200 or the curtain airbag 100 in the B-pillar-less vehicle from which the B-pillar is removed, the door trim 20 prevents the curtain airbag 100 from being pushed, thereby reinforcing the supporting force of the curtain airbag 100.

Meanwhile, an airbag device according to a fifth embodiment of the present disclosure provides a structure in which a third support chamber 310 is deployed from the second airbag and is deployed in a shape expanding toward the curtain airbag 100, and the third support chamber 310 and the first airbag are coupled by a fifth coupling device.

The first airbag may be the curtain airbag 100, and the second airbag may be the front airbag 300 configured to be deployed from the front side of the seat 10.

Further, the fifth coupling device includes a front coupling part 320 fixed to an outboard side of the third support chamber 310 and a fifth curtain coupling part 170 fixed to an inboard side of the curtain airbag 100, fixed to a position matched with the front coupling part 320, and coupled to the front coupling part 320.

Figure 15:
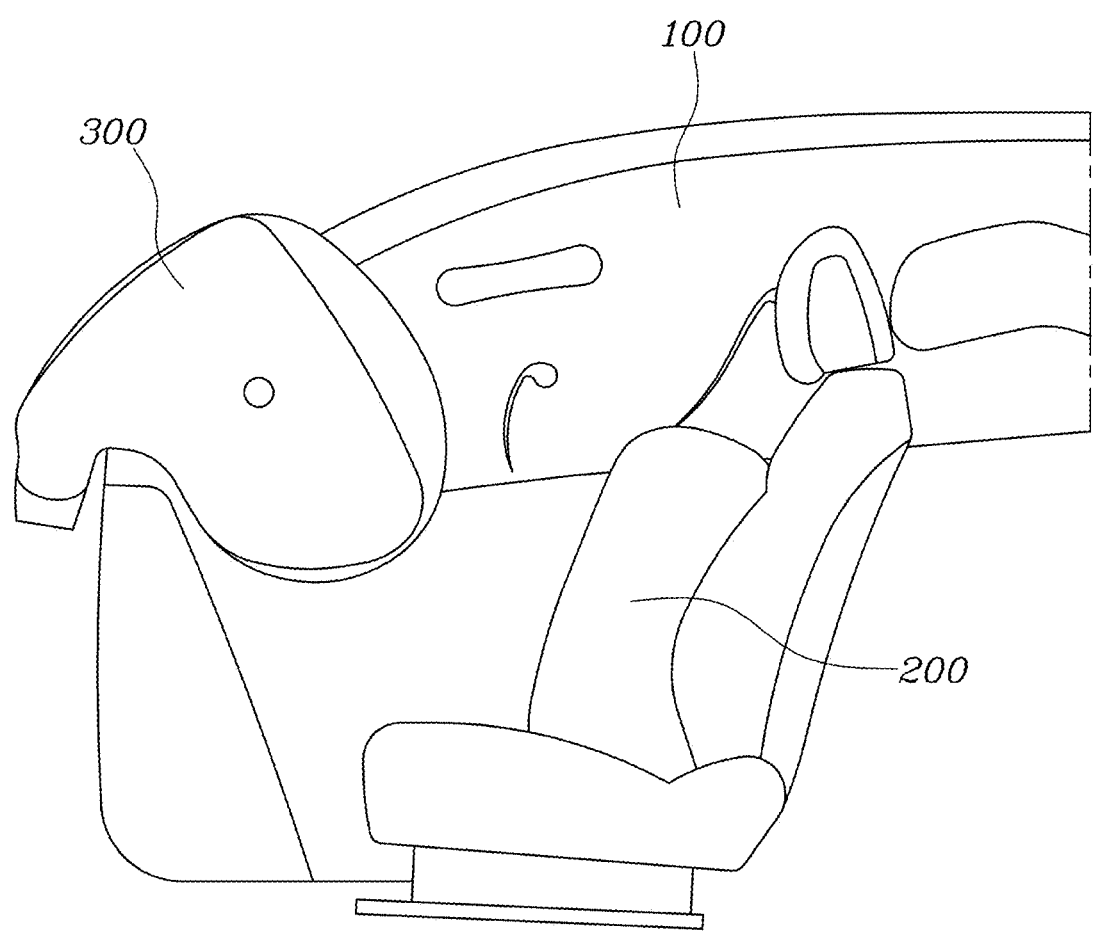
FIG. 15 is a view illustrating a shape in which the curtain airbag and a front airbag are deployed according to a fifth embodiment of the present disclosure.
Figure 16:
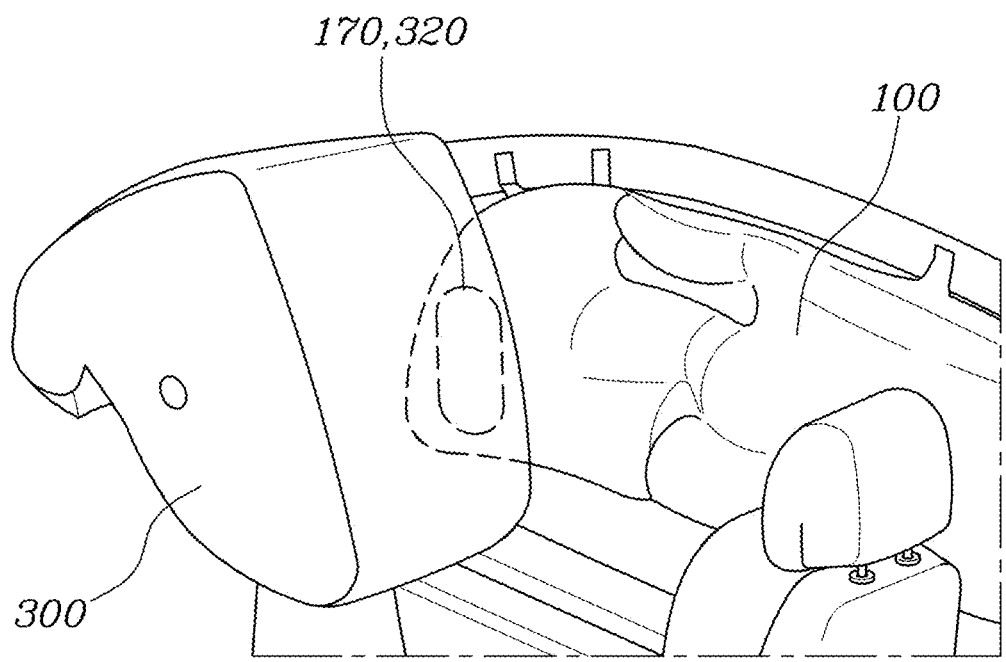
FIG. 16 is a view illustrating a shape in which the curtain airbag and the front airbag are coupled using a coupling device in a state in which the curtain airbag and the front airbag are deployed according to an embodiment of the present disclosure.
Figure 17:
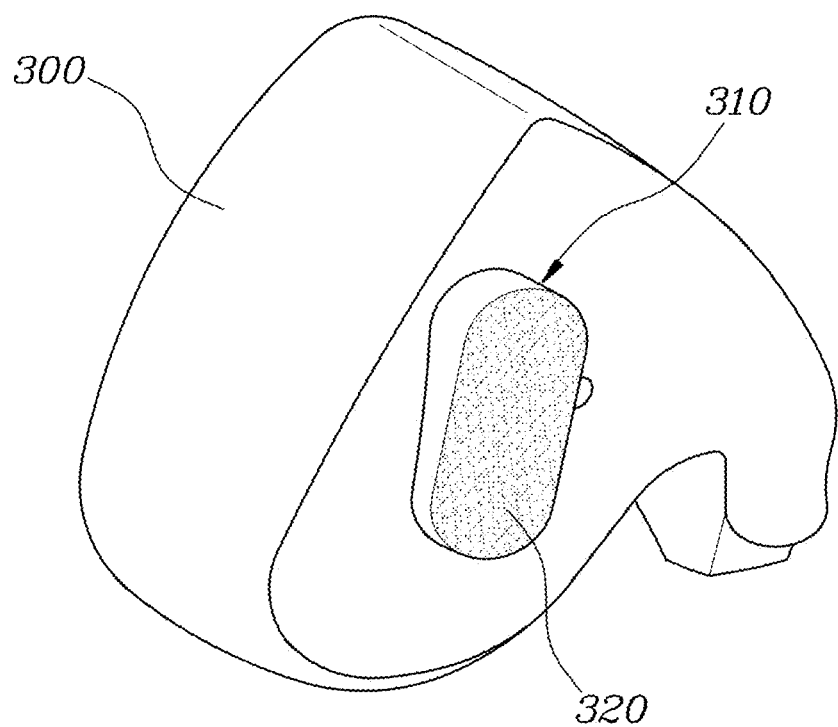
FIG. 17 is a view illustrating a front fastener provided on the front airbag according to an embodiment of the present disclosure.

With reference to FIGS. 15 to 17, the front airbag 300 is a passenger seat airbag installed at a front side of the passenger seat, and a cushion of the front airbag 300 is folded in a crash pad or cockpit of the vehicle.

Further, an inflator is connected to the cushion of the front airbag 300, and a gas discharged from the inflator is introduced into the cushion, such that the front airbag 300 is deployed toward a passenger seated in the passenger seat.

In particular, the third support chamber 310 is deployed from the front airbag 300, and the third support chamber 310 is deployed toward the curtain airbag 100 from the lateral surface of the outboard side of the front airbag 300.

Further, the front coupling part 320 is fixed to an end of the third support chamber 310 directed toward the outboard side, and the fifth curtain coupling part 170 is fixed to a lateral surface of a foremost side of the curtain airbag 100 directed toward the inboard side, such that the front coupling part 320 and the fifth curtain coupling part 170 are coupled.

The front coupling part 320 and the fifth curtain coupling part 170 may be coupled in a hook and loop fastening manner.

As described above, according to embodiments of the present disclosure, the front airbag 300 is coupled to the curtain airbag 100, and the curtain airbag 100 is deployed in a shape blocking the lateral surface of the front airbag 300. Therefore, in the event of a frontal or broadside collision such as a small-overlap collision or a new oblique moving deformable barrier collision, the passenger's head is prevented from being ejected to the lateral surface of the front airbag 300, thereby reducing a risk of injury to the passenger.

Next, according to an embodiment of the present disclosure, the third support chamber 310, together with the front airbag 300, is deployed toward the curtain airbag 100 after the curtain airbag 100 is deployed, such that the third support chamber 310 may be coupled to the curtain airbag 100 while pushing the curtain airbag 100.

That is, after the curtain airbag 100 is deployed first, the front airbag 300 is deployed toward the passenger, and then the third support chamber 310 is deployed toward the curtain airbag 100, such that the front coupling part 320 and the fifth curtain coupling part 170 are stably attached in a hook and loop fastening manner.

Further, as illustrated in FIG. 17, the third support chamber 310 is folded in the front airbag 300 in a tuck-in manner. When the front airbag 300 is deployed, the third support chamber 310 may be deployed toward the curtain airbag 100.

That is, the third support chamber 310 is folded in a tuck-in manner by being folded and inserted into an outer surface of the front airbag 300 facing the curtain airbag 100, such that the third support chamber 310 is deployed while protruding toward the curtain airbag 100 when the front airbag 300 is deployed.

Therefore, the third support chamber 310 is deployed while pressing and pushing the inner surface of the curtain airbag 100, such that the front coupling part 320 and the fifth curtain coupling part 170 are more stably attached in a hook and loop fastening manner.

Furthermore, as illustrated in FIGS. 16 and 17, in embodiments of the present disclosure, the front coupling part 320 may be formed in the upward/downward length direction of the curtain airbag 100.

That is, when the passenger's head impacting the front airbag 300 is rotated toward the curtain airbag 100 in the event of a frontal or broadside collision of the vehicle, the passenger's head is likely to be ejected without being properly restrained by the front airbag 300.

Therefore, a coupling region between the front coupling part 320 and the fifth curtain coupling part 170 is set to be long in the upward/downward length direction, such that a region for protecting the passenger's head is sufficiently ensured, thereby more assuredly preventing the passenger's head from being ejected between the front airbag 300 and the curtain airbag 100.

In addition, the coupling structure between the front coupling part 320 and the fifth curtain coupling part 170 minimizes the inadvertent forward/rearward movements of the front airbag 300 and the curtain airbag 100, thereby reinforcing the supporting force of the curtain airbag 100 and the front airbag 300.

Meanwhile, an airbag device according to a sixth embodiment of the present disclosure provides a structure in which fourth support chambers 410 are deployed from the second airbag and deployed in a shape expanding toward the curtain airbag 100, and the fourth support chamber 410 and the first airbag are coupled by a sixth coupling device.

The first airbag may be the curtain airbag 100, and the second airbag may be the roof airbag 400 configured to be deployed downward from the roof of the vehicle.

Further, the sixth coupling device includes a roof coupling part 420 fixed to an outboard side of the fourth support chamber 410 and a sixth curtain coupling part 180 fixed to an inboard side of the curtain airbag 100, fixed to a position matched with the roof coupling part 420, and coupled to the roof coupling part 420.

Figure 18:
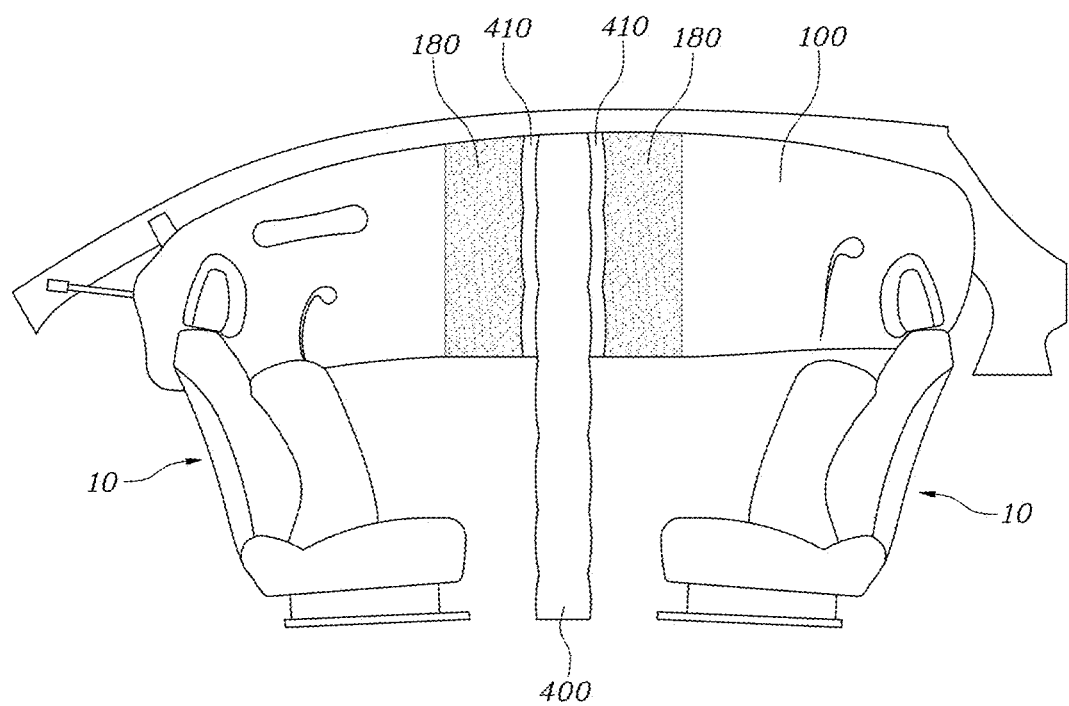
FIG. 18 is a view illustrating a shape in which the curtain airbag and a roof airbag are deployed according to a sixth embodiment of the present disclosure.
Figure 19:
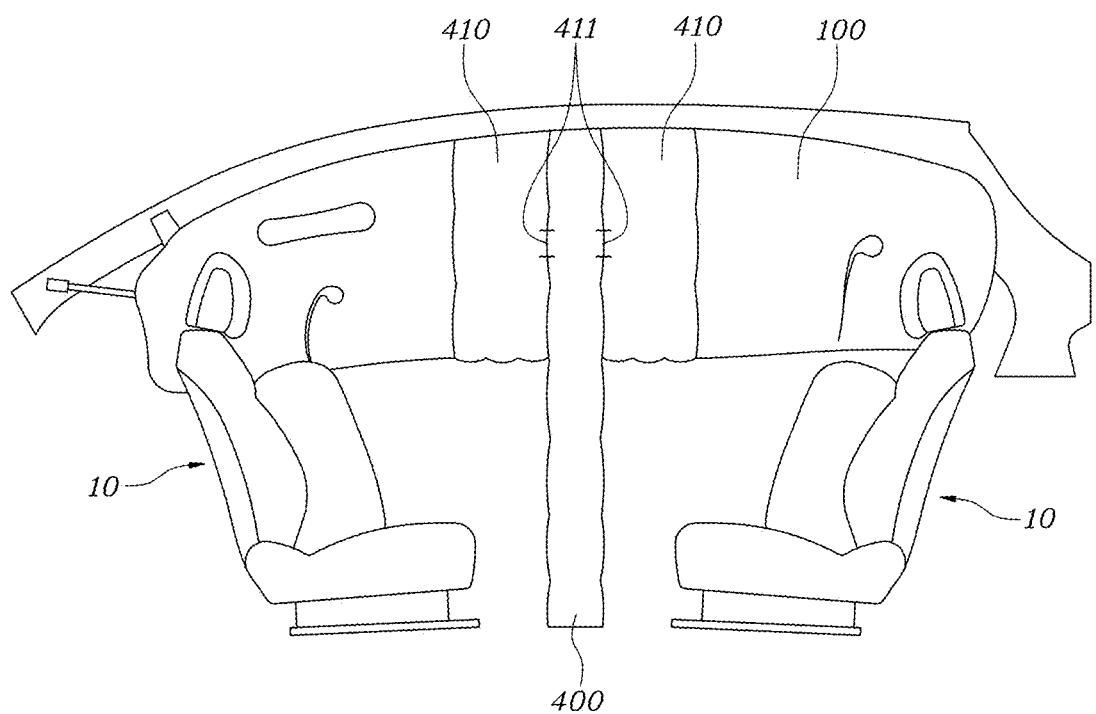
FIG. 19 is a view illustrating a shape in which a fourth support chamber provided in the roof airbag in FIG. 18 is deployed.

With reference to FIGS. 18 and 19, a cushion of the roof airbag 400 is folded in a roof part of the vehicle.

Further, an inflator is connected to the cushion of the roof airbag 400, and a gas discharged from the inflator is introduced into the cushion, such that the roof airbag 400 is deployed downward.

In addition, the fourth support chambers 410 are deployed from the roof airbag 400, and the fourth support chambers 410 are deployed toward the curtain airbag 100 from the left and right sides of the roof airbag 400.

In particular, the roof coupling part 420 is fixed to a lateral surface of the fourth support chamber 410 directed toward the outboard side, and the sixth curtain coupling part 180 is fixed to a lateral surface of the curtain airbag 100 directed toward the inboard side, such that the roof coupling part 420 and the sixth curtain coupling part 180 are coupled.

The roof coupling part 420 and the sixth curtain coupling part 180 may be coupled in a hook and loop fastening manner. The roof coupling part 420 may be fixed to an entire outer surface of the fourth support chamber 410, and the sixth curtain coupling part 180 may be fixed to a part of an inner surface of the curtain airbag 100 matched with the roof coupling part 420.

As described above, according to embodiments of the present disclosure, the roof airbag 400 is coupled to the curtain airbag 100, such that the supporting force is ensured against the inadvertent forward/rearward movement of the roof airbag 400.

Therefore, the supporting force of the roof airbag 400 is reinforced. In particular, the motions of the passengers impacting the roof airbag 400 in the facing postures of the front-row and rear-row seats 10 are minimized, thereby safely protecting the passengers. Of course, it is possible to support the passenger impacting the airbag even though the front-row and rear-row seats 10 are not disposed in the facing postures.

Next, the fourth support chamber 410, together with the roof airbag 400, is deployed toward the curtain airbag 100 after the curtain airbag 100 is deployed, such that the fourth support chamber 410 may be coupled to the curtain airbag 100 while pushing the curtain airbag 100.

That is, after the curtain airbag 100 is deployed first, the roof airbag 400 is deployed toward a floor of an occupant compartment, and the fourth support chamber 410 is deployed toward the curtain airbag 100, such that the roof coupling part 420 fixed to the fourth support chamber 410 and the sixth curtain coupling part 180 fixed to the curtain airbag 100 are stably attached in a hook and loop fastening manner.

Further, as illustrated in FIG. 19, gas holes 411 are formed between the roof airbag 400 and the fourth support chamber 410, such that the gas with which the roof airbag 400 is filled may fill the fourth support chamber 410 through the gas holes 411.

That is, the gas holes 411 are formed in the lateral surface of the roof airbag 400 and the lateral surface of the fourth support chamber 410 and communicate with each other. Therefore, when the roof airbag 400 is deployed as the gas of the inflator is supplied to the roof airbag 400, the gas in the roof airbag 400 fills the fourth support chamber 410, such that the fourth support chamber 410 is deployed.

Therefore, the fourth support chamber 410 is deployed while pressing the curtain airbag 100, such that the roof coupling part 420 and the sixth curtain coupling part 180 are stably attached in a hook and loop fastening manner.

In addition, the fourth support chamber 410 is roll-folded in an outboard manner from the inboard side to the outboard side. When the roof airbag 400 is deployed, the fourth support chamber 410 may be deployed while the roll shape is unwound from the outboard side to the inboard side.

That is, the fourth support chamber 410, which is roll-folded in the roof airbag 400, is deployed while being unfolded toward the outboard side, such that the fourth support chamber 410 is deployed while pressing and pushing the inner surface of the curtain airbag 100 outward, and the roof coupling part 420 and the sixth curtain coupling part 180 are more stably attached in a hook and loop fastening manner.

As described above, according to embodiments of the present disclosure, the curtain airbag 100 is coupled to the side airbag 200, such that the side airbag 200 reinforces the supporting force of the curtain airbag 100 in the B-pillar-less vehicle from which the B-pillar is removed. Therefore, the occupant is prevented from being completely or partially ejected through the lateral window glass in the event of a rollover accident or broadside collision of the vehicle, thereby reducing a risk of injury to the passenger.

Further, the front airbag 300 is coupled to the curtain airbag 100, and the curtain airbag 100 is deployed in a shape blocking the lateral surface of the front airbag 300. Therefore, in the event of a frontal or broadside collision such as a small-overlap collision or a new oblique moving deformable barrier collision, the passenger's head is prevented from being ejected to the lateral surface of the front airbag 300, thereby reducing a risk of injury to the passenger.

Further, the roof airbag 400 is coupled to the curtain airbag 100, such that the supporting force is ensured against the inadvertent forward/rearward movement of the roof airbag 400. Therefore, the supporting force of the roof airbag 400 is reinforced, and the motion of the passenger impacting the roof airbag 400 is minimized, thereby safely protecting the passenger.

While embodiments of the present disclosure have been described with reference to the specific examples, it is apparent to those skilled in the art that various modifications and alterations may be made within the technical spirit of the present disclosure, and these modifications and alterations belong to the appended claims.

What is claimed is:

1. An airbag device comprising:
   a first airbag configured to be deployed in a shape covering a lateral outer periphery in a vehicle; and
   a second airbag configured to be deployed at a position different from a position of the first airbag in the vehicle and coupled and supported by a coupling device at a portion where the second airbag overlaps the first airbag;
   wherein a first support chamber is deployed from the first airbag in a shape expanding toward the second airbag; and
   wherein the first support chamber and the second airbag are coupled by a first coupling device in response that the first support chamber and the second airbag are deployed.

2. The airbag device of claim 1, wherein:
   the first airbag is a curtain airbag and the second airbag is a side airbag configured to be deployed from a lateral surface of a seat; and
   the first coupling device comprises:
   a first side coupling part fixed to an outboard side of the side airbag; and
   a first curtain coupling part fixed to an inboard side of the first support chamber, fixed to a position matched with the first side coupling part, and coupled to the first side coupling part.

3. The airbag device of claim 2, wherein:
   the first support chamber, together with the curtain airbag, is deployed toward the side airbag, and the first support chamber is coupled to the side airbag while pushing the side airbag after the side airbag is deployed;
   the first support chamber is roll-folded in an outboard manner from the inboard side to the outboard side; and
   the first support chamber is deployed while a roll shape is unwound from the outboard side to the inboard side in a state in which the curtain airbag is deployed.

4. An airbag device comprising:
   a first airbag configured to be deployed in a shape covering a lateral outer periphery in a vehicle; and
   a second airbag configured to be deployed at a position different from a position of the first airbag in the vehicle and coupled and supported by a coupling device at a portion where the second airbag overlaps the first airbag, wherein second support chambers are deployed from the first airbag in a shape covering the second airbag, and wherein the second support chambers and the second airbag are coupled by a second coupling device.

5. The airbag device of claim 4, wherein:
the first airbag is a curtain airbag and the second airbag is a side airbag configured to be deployed from a lateral surface of a seat;
an insertion groove portion is defined between the second support chambers at left and right sides as the second support chambers are deployed in a shape protruding downward from left and right sides of a lower end of the curtain airbag; and
an upper end of the side airbag is inserted into the insertion groove portion, and the second support chambers cover the upper end of the side airbag from the left and right sides.

6. The airbag device of claim 5, wherein the second coupling device comprises:
a second curtain coupling part fixed to an inner surface of the insertion groove portion; and
a second side coupling part fixed to the upper end of the side airbag in a position matched with the second curtain coupling part to be coupled to the second curtain coupling part.

7. The airbag device of claim 5, wherein a catching protrusion portion protrudes from an inner surface of the insertion groove portion, a catching groove portion is disposed at the upper end of the side airbag in a position matched with the catching protrusion portion, and the catching protrusion portion is configured to be caught by an inner portion of the catching groove portion.

8. The airbag device of claim 5, wherein:
the second support chambers, together with the curtain airbag, are deployed toward the side airbag, and the second support chambers are coupled to the side airbag while pushing the side airbag toward the insertion groove portion after the side airbag is deployed;
the second support chambers are roll-folded outward from inside in an outboard manner; and
the second support chambers are deployed while roll shapes are unwound inward from outside in a state in which the curtain airbag is deployed.

9. An airbag device comprising:
a first airbag configured to be deployed in a shape covering a lateral outer periphery in a vehicle; and
a second airbag configured to be deployed at a position different from a position of the first airbag in the vehicle and coupled and supported by a coupling device at a portion where the second airbag overlaps the first airbag, wherein the first airbag is deployed in a shape supporting one side of the second airbag, and wherein the first airbag and the second airbag are coupled by a third coupling device.

10. The airbag device of claim 9, wherein:
the first airbag is a curtain airbag and the second airbag is a side airbag configured to be deployed from a lateral surface of a seat;
an upper end of the side airbag is inclined downward from an inboard side to an outboard side; and
a lower end of the curtain airbag has a shape matched with an inclination of the upper end of the side airbag, and the curtain airbag is configured to support the lateral surface of the outboard side of the side airbag.

11. The airbag device of claim 10, wherein the third coupling device comprises:
a third side coupling part disposed on an inclined surface of the upper end of the side airbag; and
a third curtain coupling part fixed to the inclined surface of the lower end of the curtain airbag in a position matched with the third side coupling part to be coupled to the third side coupling part.

12. An airbag device comprising:
a first airbag configured to be deployed in a shape covering a lateral outer periphery in a vehicle; and
a second airbag configured to be deployed at a position different from a position of the first airbag in the vehicle and coupled and supported by a coupling device at a portion where the second airbag overlaps the first airbag, wherein the first airbag is a curtain airbag supported on a lateral door, and wherein the curtain airbag and the lateral door are coupled by a fourth coupling device.

13. The airbag device of claim 12, wherein the fourth coupling device comprises:
a fourth curtain coupling part fixed to a lateral surface of an outboard side of the curtain airbag; and
a door coupling part fixed to a lateral surface of an inboard side of a door trim in a position matched with the fourth curtain coupling part to be coupled to the fourth curtain coupling part.

14. An airbag device comprising:
a first airbag configured to be deployed in a shape covering a lateral outer periphery in a vehicle; and
a second airbag configured to be deployed at a position different from a position of the first airbag in the vehicle and coupled and supported by a coupling device at a portion where the second airbag overlaps the first airbag, wherein a third support chamber is deployed from the second airbag in a shape expanding toward the first airbag, and wherein the third support chamber and the first airbag are coupled by a fifth coupling device.

15. The airbag device of claim 14, wherein:
the first airbag is a curtain airbag and the second airbag is a front airbag configured to be deployed from a front side of a seat; and
the fifth coupling device comprises:
a front coupling part fixed to an outboard side of the third support chamber; and
a fifth curtain coupling part fixed to an inboard side of the curtain airbag in a position matched with the front coupling part to be coupled to the front coupling part.

16. The airbag device of claim 15, wherein the third support chamber, together with the front airbag, is deployed toward the curtain airbag and the third support chamber is coupled to the curtain airbag while pushing the curtain airbag after the curtain airbag is deployed.

17. An airbag device comprising:
a first airbag configured to be deployed in a shape covering a lateral outer periphery in a vehicle; and
a second airbag configured to be deployed at a position different from a position of the first airbag in the vehicle and coupled and supported by a coupling device at a portion where the second airbag overlaps the first airbag, wherein a fourth support chamber is deployed from the second airbag in a shape expanding toward the first airbag, and wherein the fourth support chamber and the first airbag are coupled by a sixth coupling device.

18. The airbag device of claim 17, wherein:
the first airbag is a curtain airbag and the second airbag is a roof airbag configured to be deployed downward from a roof of the vehicle; and
the sixth coupling device comprises:
a roof coupling part fixed to an outboard side of the fourth support chamber; and a sixth curtain coupling part fixed to an inboard side of the curtain airbag in a position matched with the roof coupling part to be coupled to the roof coupling part.

19. The airbag device of claim 18, wherein the fourth support chamber, together with the roof airbag, is deployed toward the curtain airbag and the fourth support chamber is coupled to the roof airbag while pushing the roof airbag after the curtain airbag is deployed.

* * * * *